(12) United States Patent
Pavuk

(10) Patent No.: US 6,929,084 B2
(45) Date of Patent: Aug. 16, 2005

(54) SUSPENSION MODULE FOR USE WITH AN INDEPENDENT SUSPENSION INCLUDING SEMI-TRAILING ARMS WITH AIRBAG SUPPORTS

(75) Inventor: Gregory D. Pavuk, Royal Oak, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 198 days.

(21) Appl. No.: 10/178,289

(22) Filed: Jun. 24, 2002

(65) Prior Publication Data

US 2003/0001354 A1 Jan. 2, 2003

Related U.S. Application Data

(60) Provisional application No. 60/302,021, filed on Jun. 29, 2001.

(51) Int. Cl.$^7$ ................................................ B60K 17/16
(52) U.S. Cl. ........................................ 180/353; 180/354
(58) Field of Search ............................ 180/353, 354, 180/359, 360

(56) References Cited

U.S. PATENT DOCUMENTS

| | | |
|---|---|---|
| 4,576,366 A | 3/1986 | Gallas et al. |
| 4,596,299 A | 6/1986 | Krude |
| 5,088,763 A | 2/1992 | Galazin et al. |
| 5,470,096 A | 11/1995 | Baxter |
| 5,509,688 A * | 4/1996 | Tingstad ..................... 280/789 |
| 5,788,263 A | 8/1998 | VanDenberg |

FOREIGN PATENT DOCUMENTS

WO      WO 99/61268      12/1999

OTHER PUBLICATIONS

European Search Report dated Jan. 2, 2004.

* cited by examiner

Primary Examiner—Kurt Rowan
(74) Attorney, Agent, or Firm—Carlson, Gaskey & Olds

(57) ABSTRACT

A suspension module for use with an independent suspension system includes a subframe having a pair of subframe rails and a bridge supported therebetween. A pair of semi-trailing arms are pivotally attached to the subframe rails. Each semi-trailing arm includes an airbag support onto which an airbag is mounted. The airbags are positioned between the airbag supports and the subframe rails. A shock absorber extends from the semi-trailing arms to the subframe rails. A drive line brings rotational drive from a transmission to a carrier housing attached to the bridge of the subframe. A carden shaft extends from the carrier housing to spindles attached to the semi-trailing arms to transmit rotational drive from the carrier housing to the spindles.

8 Claims, 2 Drawing Sheets

SUSPENSION MODULE FOR USE WITH AN INDEPENDENT SUSPENSION INCLUDING SEMI-TRAILING ARMS WITH AIRBAG SUPPORTS

This application claims priority to U.S. Provisional Application Ser. No. 60/302,021 filed on Jun. 29, 2001.

BACKGROUND OF THE INVENTION

The present invention relates generally to a suspension module for use with an independent suspension preferably including a pair of pivotal semi-trailing arms each having an airbag support which supports an airbag positioned between the semi-trailing arms and a subframe.

Heavy vehicles, such as trucks, typically utilize a suspension system to provide a smooth and comfortable ride. A suspension system commonly includes a pair of parallel suspension arms which are pivotally attached to generally parallel frame rails of the vehicle chassis. An airbag is attached to the frame rail to compensate for various wheel load conditions. The suspension system translates road forces imparted to the wheels into rotational movement of the suspension arms relative to the frame rail. The rotational movement of the suspension arm is cushioned by the airbags.

In one prior art commercial vehicle system, the airbags are mounted to a transverse beam extending across the ends of the suspension arms and supported on the frame rails. This prior art system is not an independent suspension.

In another prior art independent suspension system, the airbags are mounted to the suspension arms over the axle centerline and directly attached to the frame rails of the vehicle chassis. This positioning of the airbags over the axle centerline in an independent suspension makes the fitting of the suspension system under the frame rail of the vehicle chassis difficult. This problem increases when double tires are employed and as vehicle weight increases, requiring larger airbags.

Finally, coil spring positioned over the axle centerline and attached directly to the frame have been employed in passenger vehicles.

SUMMARY OF THE INVENTION

A suspension module for use in an independent suspension system is secured to the frame of a vehicle chassis and includes a subframe having a pair of spaced apart generally parallel subframe rails and a bridge supported therebetween. The suspension module further includes a pair of independently moveable suspension semi-trailing arms which are pivotally attached to the subframe rails. A spindle is bolted on each of the semi-trailing arms to receive a wheel.

Each of the semi-trailing arms further include an airbag support onto which an airbag is mounted. The airbags provide vertical load support and are positioned between the airbag supports and the subframe rails. A shock absorber extending from each semi-trailing arms to the subframe rails dampens movement. Preferably, the shock absorbers are positioned directly over the axle centerline.

A drive line transmits rotational drive from a transmission to a carrier housing attached to the bridge of the subframe by a carrier by visco-elastic mounts. The carrier housing can be detached from the bridge, allowing the carrier housing to be rotated 180° between a rear engine configuration and a front engine configuration. A carden shaft extending from the carrier housing to each of the spindles transmits rotational drive from the carrier housing to the spindles.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
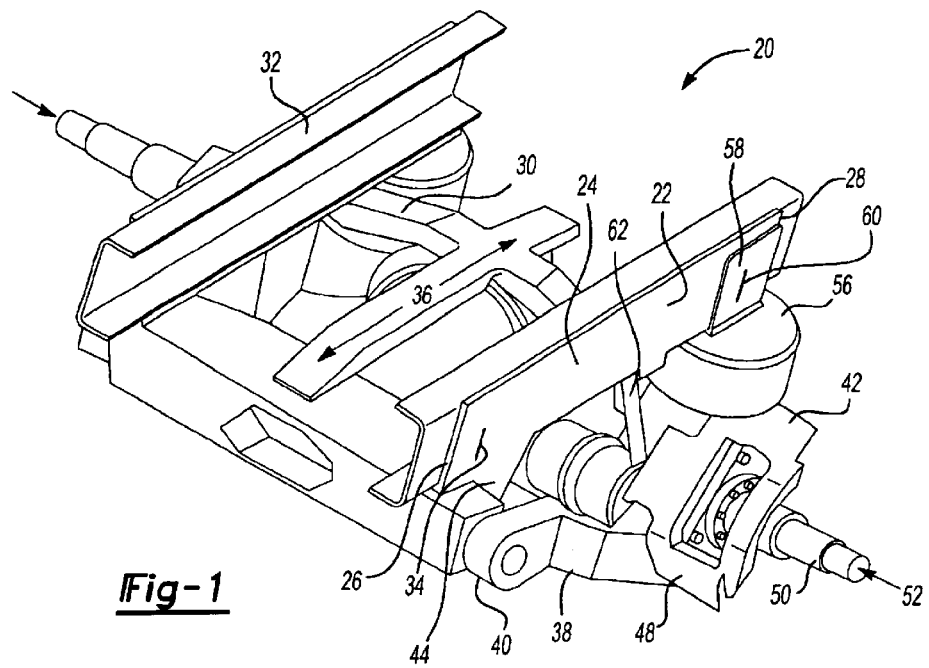
FIG. 1 illustrates a perspective view of the suspension module of the present invention including semi-trailing arms with airbag supports.

FIG. 1 illustrates a perspective view of the suspension module 20 of the present invention. The suspension module 20 is employed in an independent suspension system of a heavy vehicle, such as a commercial truck, to improve design and flexibility. The suspension module 20 includes a subframe 22 having a pair of spaced apart generally parallel subframe rails 24 each including a first end 26 having a hanger bracket 44 and an opposing second end 28. A bridge 30 extends between the subframe rails 24. The subframe 22 defines a longitudinal axis 36 which extends along the longitudinal length of the vehicle.

The subframe rails 24 are secured to a frame 32 of a vehicle chassis by an attachment mechanism 34, such as bolts, welding, or the like. The vehicle frame 32 provides the primary structural support of the body of the vehicle.

Figure 2:
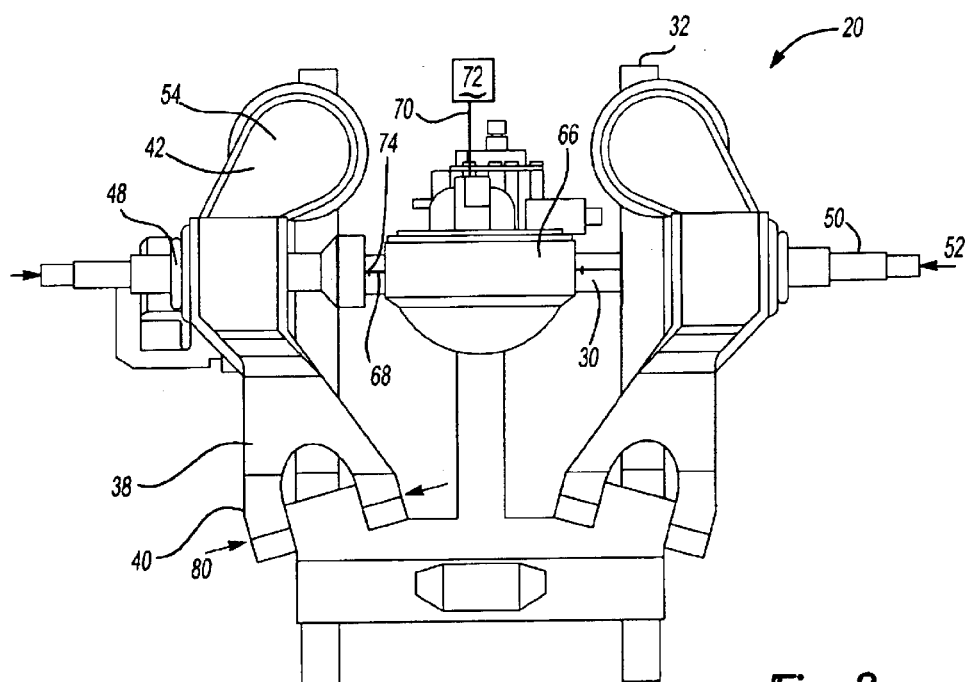
FIG. 2 illustrates a side view of the suspension module.
Figure 3:
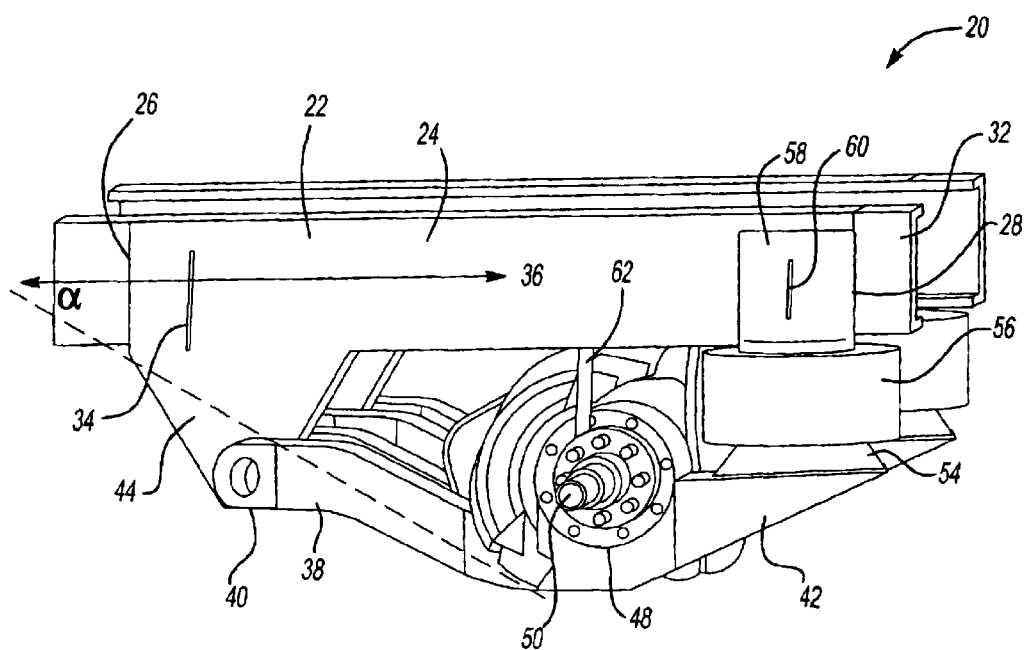
FIG. 3 illustrates a bottom view of the suspension module.

As illustrated in FIG. 2, the suspension module 20 further includes a pair of independently moveable semi-trailing arms 38. A first end 40 of the semi-trailing arms 38 is pivotally attached to the hanger brackets 44 of the subframe rails 24. The semi-trailing arms 38 are independently pivotal relative to the subframe rails 24 about pivot axis 80. An angle α (as shown in FIG. 3) is defined between the longitudinal axis 36 of the vehicle frame 32 and the semi-trailing arms 38. The angle α is preferably greater than 65°.

A hub assembly 48 extends from each of the semi-trailing arms 38. The hub assemblies 48 each include a spindle 50 bolted on a knuckle which provides an axle centerline 52. Each spindle 50 receives a wheel (not shown).

A second end 42 of each of the semi-trailing arms 38 includes an airbag support 54 onto which an airbag 56 is mounted. Preferably, the airbags 56 are located on the side of the axle centerline 52 opposite to the first end 40 of the semi-trailing arms 38 and are positioned between the airbag supports 54 and the second end 28 of the subframe rails 24. That is, as shown in FIG. 1, the airbag 56 is not vertically aligned with the axle centerline 52 and is offset from a vertical plane extending through the axle centerline 52. The airbags 56 are attached to the subframe rails 24 by airbag brackets 58 which am attached to the subframe rails 24 by fasteners 60 such as bolts, welding, or the like.

The airbags 56 provide vertical load support to the independent suspension system and dampens the force during movement of the semi-trailing arms 38. The airbags 56 are preferably adjustable based on vehicle load conditions in a known manner. Although airbags 56 have been disclosed, it is to be understood that the air springs or other vertical load supporters can also be employed.

A shock absorber 62 is positioned between the semi-trailing arms 38 and the subframe rail 24 to dampen movement of the semi-trailing arms 38. Preferably, the shock absorbers 62 are positioned directly over the axle centerline 52. However, it is to be understood that the shock absorbers 62 can be located anywhere on the semi-trailing arms 38.

Returning to FIG. 2, a carrier housing 66 is attached to the bridge 30 of die subframe 22. The carrier housing 66 includes brackets 68 which are attached to the bridge 30 by visco-elastic mounts 74, providing for vibrational damping. The carrier housing 66 can be rotated 180° to change between a rear engine configuration and a front engine configuration by detaching the brackets 68 of the carrier housing 66 from the bridge 30. Alternatively, the carrier housing 66 can be rigidly mounted to the bridge 30, and the bridge 30 is mounted to the subframe 22 by the visco-elastic mounts 74.

A drive line 70 brings rotational drive from a transmission 72, shown schematically, to the carrier housing 66. A carden shaft 76 extending from the opposing sides of the carrier housing 66 to each of the spindles 50 transmits rotational drive from the carrier housing 66 to the spindles 50.

The suspension module 20 of the present invention having airbags 56 positioned between the airbags supports 54 and the subframe rails 24 can be quickly and easily secured to the frame 32 of a vehicle chassis. As the airbags 56 are positioned behind the axle centerline 52, the suspension module 20 can be easily installed in the vehicle. The independently semi-trailing arms 38 of the suspension module 20 allows for a change in camber with wheel vertical travel, and a toe change that is favorable to vehicle stability.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A suspension module comprising:

a subframe including a pair of generally parallel subframe rails;

a pair of semi-trailing arms pivotally attached to said pair of subframe rails, each of said pair of semi-trailing arms including a first end and an opposing second end, and each of said pair of semi-trailing arms being is independently pivotal at said first end about a pivot axis;

an airbag mounted on said opposing second end of each of said pair of semi-trailing arms, and each said airbag being attached to one of said pair of subframe rails; and a spindle bolted on each of said pair of semi-trailing arms between said first end and said opposing second end, and wherein said airbag is located on a side of said spindle opposite to said pivot axis.

2. The suspension module as recited in claim 1 further including an airbag bracket, and wherein said airbag is attached to each of said pair of subframe rails by said airbag bracket.

3. The suspension module as recited in claim 1 further including a shock absorber positioned between each of said pair of semi-trailing arms and said pair of subframe rails.

4. The suspension module as recited in claim 1 further including a lateral support extending between said pair of subframe rails.

5. A suspension module comprising:

a subframe including a pair of generally parallel subframe rails;

a pair of suspension arms pivotally attached to said pair of subframe rails, each of said pair of suspension arms including a first end and an opposing second end, and each of said pair of suspension arms being independently pivotal at said first end about a pivot axis;

an airbag mounted on said opposing second end of each of said pair of suspension arms, and each said airbag being attached to one of said pair of subframe rails;

a lateral support extending between said pair of subframe rails;

a carrier housing secured to said lateral support;

a spindle bolted on each of said pair of suspension arms;

a drive line that transfers rotational drive from a transmission to said carrier housing; and a carden shaft that transfers rotational drive from said carrier housing to said spindle.

6. The suspension module as recited in claim 5 wherein said carrier housing is secured to said lateral support by visco-elastic mounts.

7. A suspension system comprising:

a vehicle frame;

a subframe secured to said vehicle frame including a pair of generally parallel subframe rails attached to said vehicle frame;

a lateral support extending between said pair of subframe rails;

a carrier housing secured to said lateral support, a pair of suspension arms pivotally attached to said pair of subframe rails and each including a first end and an opposing second end, and each of said pair of suspension arms being independently pivotal at said first end about a pivot axis;

an airbag mounted on said opposing second end of each of said pair of suspension arms, and each said airbag being attached to one if said pair of subframe rails;

a spindle bolted on each of said pair of suspension arms;

a shock absorber positioned between each of said pair of suspension arms and said pair of subframe rails;

a drive line that transfers rotational drive from a transmission to said carrier housing; and a carden shaft that transfers rotational drive from said carrier housing to said spindle.

8. The suspension system as recited in claim 7 wherein said carrier housing is secured to said lateral support by visco-elastic mounts.

* * * * *